United States Patent [19]

Hyoi

[11] Patent Number: 5,444,502
[45] Date of Patent: Aug. 22, 1995

[54] EYEGLASS FRAME HAVING ADJUSTABLE RIM RETENTION STRUCTURE

[75] Inventor: Isao Hyoi, Fukui, Japan

[73] Assignee: Murai Co., Ltd., Fukui, Japan

[21] Appl. No.: 663,827

[22] PCT Filed: Nov. 18, 1988

[86] PCT. No.: PCT/JP88/01174

§ 371 Date: Jul. 17, 1990

§ 102(e) Date: Jul. 17, 1990

[87] PCT Pub. No.: WO90/05932

PCT Pub. Date: May 31, 1990

[51] Int. Cl.⁶ .............................................. G02C 1/04
[52] U.S. Cl. ............................. 351/107; 351/83; 351/129
[58] Field of Search ............... 351/103, 104, 106, 107, 351/124, 125, 154, 108, 109, 83, 102, 128, 129

[56] References Cited

U.S. PATENT DOCUMENTS 3,515,468 10/1968 Mitchell .............................. 351/106
4,550,989 11/1985 Hafner ................................ 351/154
5,135,296 8/1992 Lindberg et al. ................... 351/106

FOREIGN PATENT DOCUMENTS 49-31891 8/1974 Japan .
60-94624 6/1985 Japan .
61-46522 3/1986 Japan .
63-214716 9/1988 Japan .

Primary Examiner—William L. Sikes
Assistant Examiner—Huy Mai
Attorney, Agent, or Firm—Armstrong, Westerman, Hattori, McLeland & Naughton

[57] ABSTRACT

The present invention relates to an eyeglass frame having a tightening portion disposed in the middle of an NT alloy loop wire 6, and the outer peripheries of a pair of right and left rims, which are disposed inwardly of the loop wire, tightened and secured in position by the tightening portion. With this arrangement, an eyeglass frame having increased strength can be obtained and a wide variety of parts can be prepared to meet the various demands of users.

3 Claims, 2 Drawing Sheets

EYEGLASS FRAME HAVING ADJUSTABLE RIM RETENTION STRUCTURE

TECHNICAL FIELD

The present invention relates to an eyeglass frame and, more particularly, to an eyeglass frame which is arranged to secure a pair of rims by means of a wire.

BACKGROUND ART

A conventional eyeglass frame of this type is shown as an eyeglass frame 100 in FIG. 6. The eyeglass frame 100 is made of, for example, an NT alloy (shape memory metal), and comprises right and left rims 102 which support eyeglass lenses 101, respectively. Temples 104 are connected to the respective rims 102 by means of corresponding side joints 103, and a bridge 105 is secured to connect the rims 102. The bridge 105 has an inverted U shape and two ends 105a and 105b, and the ends 105a and 105b are connected to the respective rims 102 to support the same.

A wire which forms the rims 102 and the bridge 105 has a general thickness.

However, in the case of the aforesaid prior art eyeglass frame 100, since the bridge 105 is supported by a single wire, no sufficient strength can be obtained and the rims 102 are easily displaced and deformed by forces applied to the eyeglass frame 100. In particular, the strength of recovery from twisting is small. Also, in the case of an eyeglass frame in which the bridge 105 is secured to the rims 102 as shown in FIG. 6, once the bridge 105 is secured between the right and left rims 102, the rims 102 cannot be replaced by a different kind of rim irrespective of the demand of a user.

DISCLOSURE OF THE INVENTION

An object of the present invention is to solve the problems experienced with the above-described prior art eyeglass frame, that is, the problem that the strength of a bridge is so weak that a pair of right and left rims are easily deformed by forces applied to the eyeglass frame and, in particular, the strength of recovery from twisting is small. Another object of the present invention is to make it possible to incorporate a variety of parts which can meet the demands of individual users. An eyeglass frame according to the present invention is characterized by a groove formed in the outer periphery of each of right and left rims and a wire disposed in the groove and provided with a tightening portion in the middle of the wire, the outer peripheries of the right and left rims which are disposed inward of the loop wire being tightened by the tightening portion to secure the pair of right and left rims in position. With this arrangement, the strength of the bridge is improved, whereby the strength of recovery from twisting is particularly improved.

In addition, if rims of various designs are prepared with their tightening portions remaining loose, it is possible to meet the demands of individual users for a variety of designs.

MODE FOR CARRYING OUT THE INVENTION

Figure 1:
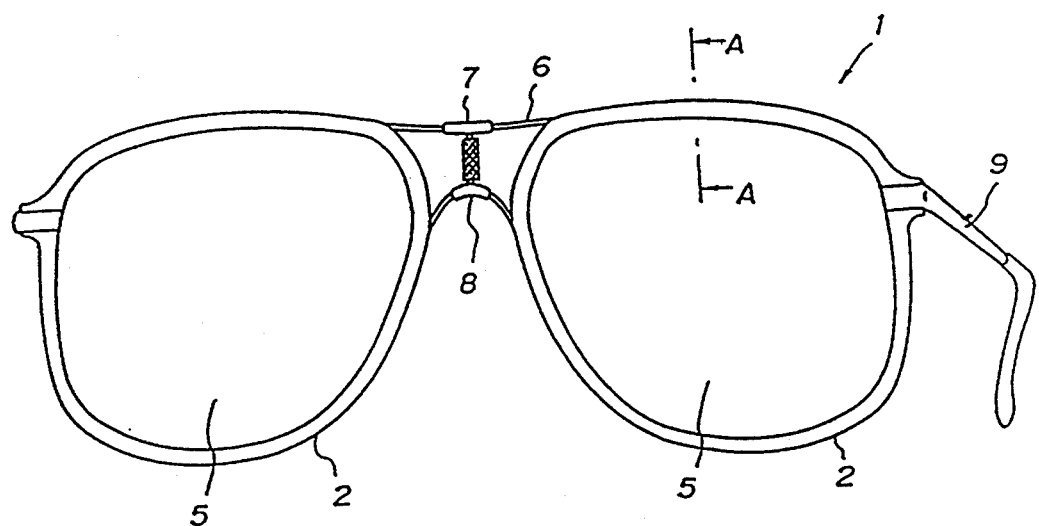
FIG. 1 is a front view showing an eyeglass frame according to the present invention.
Figure 2:
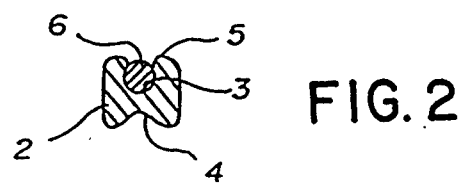
FIG. 2 is a cross-sectional view of the eyeglass frame, taken along line A—A of FIG. 1.
Figure 3:
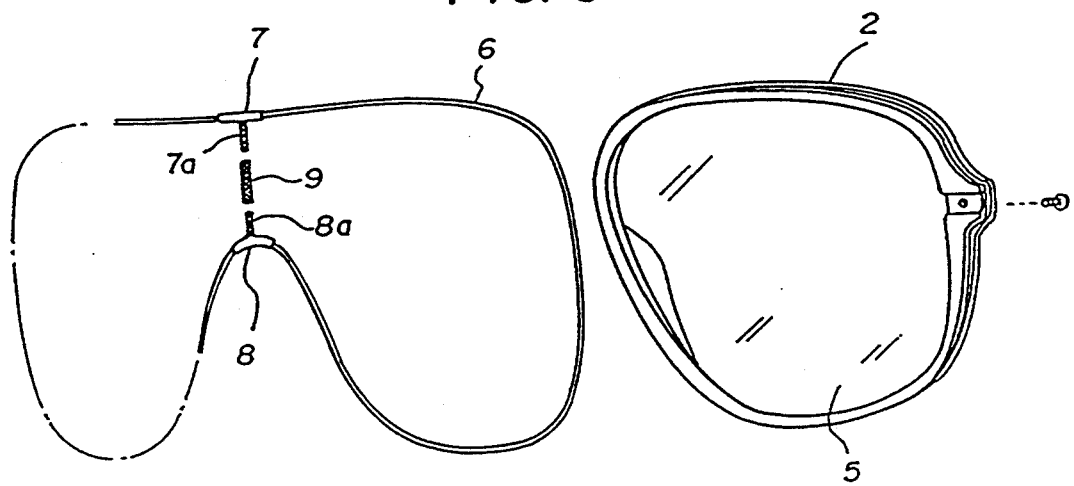
FIG. 3 is an exploded explanatory view showing the eyeglass frame according to the present invention.

An embodiment of the present invention will be described below with reference to the accompanying drawings. FIG. 1 is a front elevational view showing an eyeglass frame 1 according to the present invention, and comprises two right and left plastic rims 2. Each of the rims 2 has an upper groove 3 and a lower groove 4. The upper groove is a groove for receiving an NT alloy wire 6 which serves as a wire to be described later, while the lower groove 4 is formed to receive a substantially circular lens 5 (refer to FIG. 2).

The NT alloy wire 6, which is a wire made of, for example, an NT alloy, is disposed around the periphery of the pair of rims 2. The NT alloy wire 6 has a configuration which is the same as the configuration of the rims so as to enclose the substantially circular lenses 5. A first engagement member 7 having a pipe-like shape is disposed in the middle of the NT alloy wire 6, while a second engagement member 8 is disposed at a position which opposes the first engagement member 7. The NT alloy wire 6 extends through the interiors of the respective first and second engagement members 7 and 8, and the second engagement member 8 has a bent shape whereby the NT alloy wire 6 passing therethrough is also bent to the bent shape of the second engagement member 8. The first engagement member 7 and the second engagement member 8 are respectively provided with threaded portions 7a and 8a which are formed to extend toward each other. A nut 9 having an inner threaded periphery is mounted between the threaded portions 7a and 8a, and the threaded portions 7a and 8a are threadedly fitted into the interior of the nut 9. Since the threaded portions 7a and 8a have threads formed in opposite directions, when the nut 9 is rotated in one direction, the threaded portions 7a and 8a are forced into the nut 9 to impart tension to the NT alloy wire 6, thereby tightly securing the right and left rims 2. When the nut 9 is rotated in the other direction, the screws 7a and 8a are loosened to relax the tension of the NT alloy wire 6.

As described above, a tightening portion is constituted by the first engagement member 7 and the second engagement member 8 which are disposed in the middle of the loop NT alloy wire, the threaded portions 7a and 8a which extend toward each other from the first engagement member 7 and the second engagement member 8, respectively, and the nut 9 for securing the threaded portions 7a and 8a.

Figure 4:
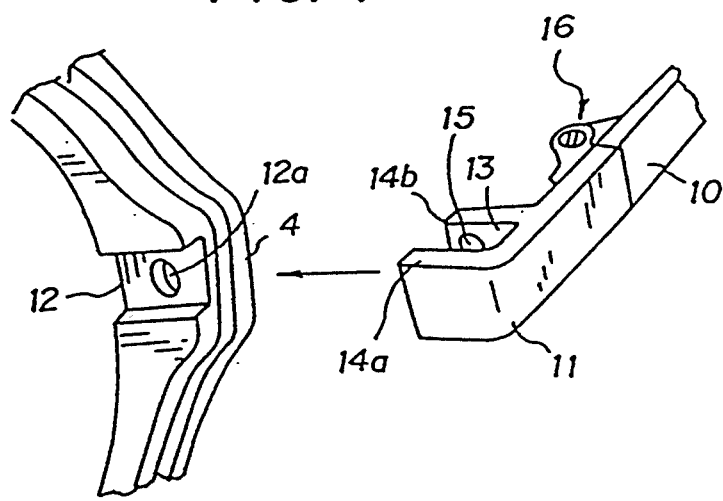
FIG. 4 is an exploded explanatory view showing the eyeglass frame according to the present invention.
Figure 5:
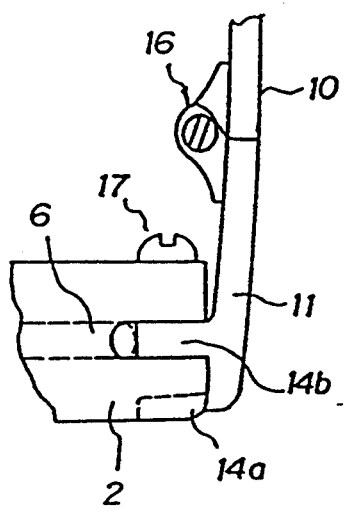
FIG. 5 is an enlarged explanatory view showing the eyeglass frame according to the present invention.
Figure 6:
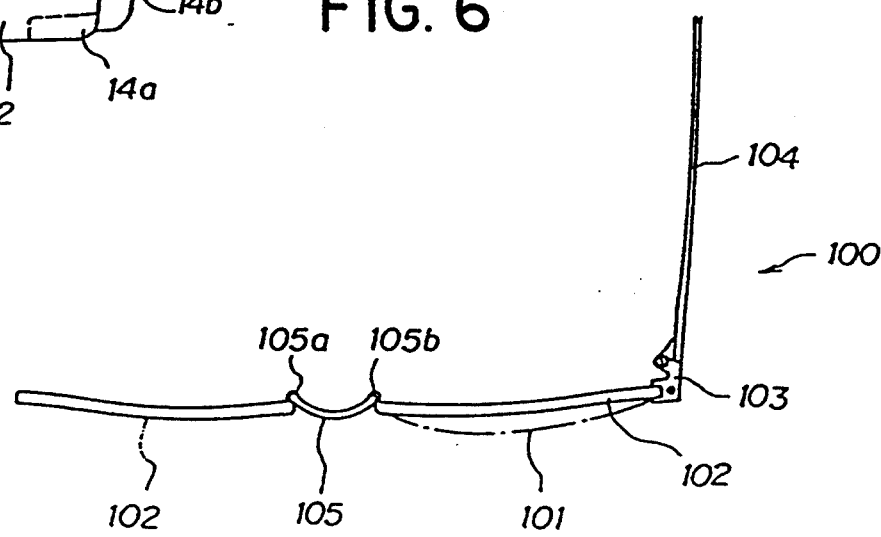
FIG. 6 is a plan view showing an eyeglass frame according to the prior art.

The manner in which the rims 2, the temples 10 and the side joints 11 are connected will be explained below with reference to FIGS. 4 and 5. The upper groove 3, which is disposed to extend along the outer periphery of the rim 2, extends into a side portion 4 of the rim 2, and a depression 12 is defined in the side portion 4. A screw-mounting hole 12a is formed in the middle of the depression 12 in such a manner as to extend through the side portion 4.

The inner periphery of the side joint 11 is provided with a recess 13 having a width equal to the thickness of the side portion 4. The recess 13 is defined by a pair of projections 14a and 14b which extend from the side joint 11 in the inward direction. The projection 14b is provided with a screw-mounting hole 15 which is positioned in alignment with the screw-mounting hole 12 when the side joint 11 is engaged with the side portion 4.

The side joint 11 and the temple 10 are connected to each other for pivotal motion on a hinge 16. When the side joints 11 are secured to the opposite sides of the rims 2 which are arranged in the above-described manner, the NT alloy wire 6 received by the upper groove 3 is secured by the projection 14b. Thus, the NT alloy wire 6 is tightly secured in the upper groove 3 of the side portion 4 of the rim 4, whereby the NT alloy wire 6 is prevented from coming away from the upper groove 3. In this state, the side portion 4 of the rim 2 and the side joint 11 are secured by threadedly inserting a machine screw 17 from the inner side of the rim 2.

Then, the nut 9 is rotated with the threaded portions 7a and 8a secured to the opposite ends of the nut 9. The rotation of the nut 9 causes the first engagement member 7 and the second engagement member to move downwardly and upwardly, respectively, so that tension is imparted to the NT alloy wire 6 to tightly secure the pair of rims 2 disposed inward of the NT alloy wire 6.

The state of engagement within the tightening portions and the rims 2 is reinforced by the eyeglass frame 1 having the above-described arrangement, whereby deformation due to forces applied to the eyeglass frame 1 is reduced and, particularly, the strength of recovery from twisting is increased.

In addition, it is possible to firmly secure the rims 2 irrespective of the configuration of the rims 2.

Accordingly, if various rims 2 which differ in shape or color are prepared, the rims 2 can be replaced by various other rims according to the demands of individual users so that it is possible to meet a wide variety of demands of users.

Although the present invention has been described with reference to a wire made of an NT alloy, other kinds of material may of course be employed.

INDUSTRIAL APPLICABILITY

Since an eyeglass frame according to the present invention is arranged so that a pair of rims are connected by a wire, the eyeglass frame is provided with a bridge having high strength and can be suitably used in the field where multiple eyeglass frames are produced in small quantities.

I claim:

1. An eyeglass frame comprising:
    a pair of oppositely spaced rim portions each adapted to receive an eyeglass lens;
    a pair of mutually spaced, opposed wire portions extending between and interconnecting said rim portions; and
    a tightening portion interconnecting said opposed wire portions, said tightening portion comprising a pair of engagement members each disposed in the middle of one of said opposed wires, threaded portions arranged to extend toward each other from said respective engagement members and an adjustable nut securing said threaded portions.

2. An eyeglass frame according to claim 1 wherein said rim portions each include a substantially annular body having grooves extending about the outer and inner peripheries thereof,
    a loop wire forming said wire portions and being received in the outer peripheral grooves of said rim portions, and
    a lens received in the inner peripheral groove of each of said rim portions.

3. An eyeglass frame according to claim 2 wherein said loop wire is formed of NT alloy.

* * * * *